United States Patent
Xue et al.

(10) Patent No.: US 12,020,655 B2
(45) Date of Patent: Jun. 25, 2024

(54) METHOD FOR CONTROLLING DISPLAY APPARATUS, DISPLAY APPARATUS, DEVICE, AND COMPUTER STORAGE MEDIUM

(71) Applicants: Beijing BOE Optoelectronics Technology Co., Ltd., Beijing (CN); BOE Technology Group Co., Ltd., Beijing (CN)

(72) Inventors: Yachong Xue, Beijing (CN); Xue Dong, Beijing (CN); Hao Zhang, Beijing (CN); Lili Chen, Beijing (CN); Jiankang Sun, Beijing (CN); Guixin Yan, Beijing (CN); Yaoyu Lv, Beijing (CN); Menglei Zhang, Beijing (CN); Xinkai Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/014,184

(22) PCT Filed: Aug. 16, 2021

(86) PCT No.: PCT/CN2021/112825
§ 371 (c)(1),
(2) Date: Jan. 3, 2023

(87) PCT Pub. No.: WO2023/019402
PCT Pub. Date: Feb. 23, 2023

(65) Prior Publication Data
US 2023/0351975 A1     Nov. 2, 2023

(51) Int. Cl.
*G09G 3/34*         (2006.01)
*G06F 3/01*         (2006.01)

(52) U.S. Cl.
CPC .......... *G09G 3/3426* (2013.01); *G06F 3/013* (2013.01); *G09G 2320/0626* (2013.01);
(Continued)

(58) Field of Classification Search
CPC ......... G09G 3/3426; G09G 2320/0626; G09G 2320/0686; G09G 2354/00; G09G 2360/16; G06F 3/013
See application file for complete search history.

(56) References Cited

U.S. PATENT DOCUMENTS

| | | | |
|---|---|---|---|
| 7,591,558 B2 * | 9/2009 | Wezowski | G06F 3/013 351/208 |
| 9,479,274 B2 * | 10/2016 | Jung | H04H 60/45 |

(Continued)

FOREIGN PATENT DOCUMENTS

| | | |
|---|---|---|
| CN | 101188665 A | 5/2008 |
| CN | 101751209 A | 6/2010 |

(Continued)

OTHER PUBLICATIONS

Ting Mei et al., "Semiconductor Lighting Technology Status and Application Prospects", pp. 78-82, Guangdong Economic Press, May 31, 2015, with English translation thereof, 32 pages.
(Continued)

*Primary Examiner* — Michael J Jansen, II
(74) *Attorney, Agent, or Firm* — XSENSUS LLP

(57) ABSTRACT

Provided is a method for controlling a display apparatus. In the method, the display apparatus receives at least two pieces of data to be displayed from at least two terminals respectively, wherein the at least two pieces of data to be displayed include screen projection data and status param-
(Continued)

eters of the at least two terminals, and then displays the status parameter, and performs a screen projection based on the screen projection data.

14 Claims, 6 Drawing Sheets

(52) U.S. Cl.
CPC . *G09G 2320/0686* (2013.01); *G09G 2354/00* (2013.01); *G09G 2360/16* (2013.01)

(56) References Cited

U.S. PATENT DOCUMENTS

| | | | |
|---|---|---|---|
| 10,288,938 B2 | 5/2019 | Chu et al. | |
| 10,838,585 B1* | 11/2020 | Douglas | G06F 3/0482 |
| 10,930,225 B2* | 2/2021 | Ji | G09G 3/3426 |
| 11,003,353 B2* | 5/2021 | Leong | H04L 65/403 |
| 11,270,657 B2 | 3/2022 | Zhao et al. | |
| 2007/0279591 A1* | 12/2007 | Wezowski | G06F 3/013 |
| | | | 351/208 |
| 2009/0055853 A1* | 2/2009 | Jung | H04H 60/45 |
| | | | 725/10 |
| 2015/0304484 A1* | 10/2015 | Halmstad | H04W 48/02 |
| | | | 455/419 |
| 2016/0026812 A1* | 1/2016 | Kim | G06F 9/451 |
| | | | 726/30 |
| 2016/0029014 A1* | 1/2016 | Kim | G06F 3/017 |
| | | | 345/214 |
| 2016/0179454 A1* | 6/2016 | Liu | G06F 3/04886 |
| | | | 715/747 |
| 2018/0024633 A1* | 1/2018 | Lo | G06F 3/1423 |
| | | | 345/156 |
| 2018/0188605 A1 | 7/2018 | Chu et al. | |
| 2018/0316943 A1* | 11/2018 | Todd | H04N 21/4781 |
| 2019/0355316 A1* | 11/2019 | Ji | G09G 3/36 |
| 2019/0361589 A1* | 11/2019 | Yerli | B25J 9/1689 |
| 2019/0371028 A1* | 12/2019 | Harrises | G06T 19/006 |
| 2020/0293261 A1* | 9/2020 | Janamanchi | H04L 12/1831 |
| 2020/0293493 A1* | 9/2020 | Janamanchi | H04L 65/1069 |
| 2020/0326846 A1* | 10/2020 | Leong | H04M 7/0027 |
| 2020/0404447 A1* | 12/2020 | Yerli | G06F 3/017 |
| 2021/0019982 A1* | 1/2021 | Todd | H04N 21/2343 |
| 2021/0035364 A1* | 2/2021 | Childress | G06F 3/013 |
| 2021/0103343 A1 | 4/2021 | Hagiwara | |
| 2021/0158766 A1 | 5/2021 | Zhao et al. | |
| 2021/0366440 A1* | 11/2021 | Burns | G09G 5/373 |
| 2022/0374188 A1* | 11/2022 | Huang | H04L 65/80 |
| 2023/0083909 A1* | 3/2023 | Haro | H04N 7/157 |
| | | | 345/619 |

FOREIGN PATENT DOCUMENTS

| | | |
|---|---|---|
| CN | 102169667 A | 8/2011 |
| CN | 102681654 A | 9/2012 |
| CN | 102830796 A | 12/2012 |
| CN | 105788539 A | 7/2016 |
| CN | 106328071 A | 1/2017 |
| CN | 109683703 A | 4/2019 |
| CN | 109979401 A | 7/2019 |
| CN | 110505508 A | 11/2019 |
| CN | 112083915 A | 12/2020 |
| EP | 2214079 A2 | 8/2010 |
| EP | 2869188 A1 | 5/2015 |
| EP | 3226126 A1 | 10/2017 |
| WO | 2013/096086 A1 | 6/2013 |

OTHER PUBLICATIONS

Xinyuan Lian, "Reconstructing Auditory Media Landscape A Research on City Radio Transformation", pp. 225-237, Communication University of China Press, Aug. 31, 2017, with English translation thereof, 32 pages.

Partial European Search Report issued on Mar. 28, 2024, in corresponding European patent Application No. 21953656.2 , 13 pages.

* cited by examiner

| Receiving at least two pieces of data to be displayed from at least two terminals respectively, wherein the at least two pieces of data to be displayed include screen projection data and status parameters of the at least two terminals | 201 |

| Displaying the status parameters, and performing a screen projection based on the screen projection data | 202 |

METHOD FOR CONTROLLING DISPLAY APPARATUS, DISPLAY APPARATUS, DEVICE, AND COMPUTER STORAGE MEDIUM

CROSS-REFERENCE TO RELATED APPLICATION

This application is a U.S. national stage of international application No. PCT/CN2021/112825, filed on Aug. 16, 2021, the content of which is incorporated herein by reference in its entirety.

TECHNICAL FIELD

The present disclosure relates to the field of machine visions, and in particular, relates to a method for controlling a display apparatus, a display apparatus, a device, and a computer storage medium.

BACKGROUND

Currently, with the development of display technologies of modern display apparatuses, interactions of the display apparatuses and terminals such as a mobile phone, a smart appliance, and the like are increasing.

SUMMARY

Embodiments of the present disclosure provide a method for controlling a display apparatus, a display apparatus, a device, and a computer storage medium. The technical solutions are as follows.

In a first aspect of the present disclosure, a method for controlling a display apparatus is provided. The method includes:
  receiving at least two pieces of data to be displayed from at least two terminals respectively, wherein the at least two pieces of data to be displayed include screen projection data and status parameters of the at least two terminals; and
  displaying the status parameters, and performing a screen projection based on the screen projection data.

Optionally, receiving the at least two at least two data to be displayed from the at least two terminals respectively includes:
  receiving the screen projection data from a first terminal; and
  receiving the status parameter of a second terminal from the second terminal.

Optionally, the method further includes:
  acquiring a control signal, wherein the control signal is configured to adjust the status parameter of the second terminal; and
  sending the control signal to the second terminal.

Optionally, displaying the status parameters, and performing the screen projection based on the screen projection data include:
  performing the screen projection and displaying the status parameters on at least two display regions of a display face of the display apparatus respectively.

Optionally, the method further includes:
  acquiring display region adjustment information; and
  adjusting the at least two display regions based on the display region adjustment information.

Optionally, the display apparatus includes a human eye detection assembly; and acquiring the display region adjustment information includes:
  acquiring a distance between human eyes viewing the display apparatus and the display face of the display apparatus by the human eye detection assembly;
  determining a size of a gaze region of the human eyes based on the distance and a predetermined vision field of the human eyes; and
  generating the display region adjustment information based on the size of the gaze region of the human eyes, wherein the display region adjustment information is indicative of setting sizes of the at least two display regions to be less than or equal to the size of the gaze region of the human eyes.

Optionally, the display apparatus includes a human eye detection assembly, and acquiring the display region adjustment information includes:
  acquiring a distance between human eyes viewing the display apparatus and the display face of the display apparatus and a gaze position of the human eyes by the human eye detection assembly;
  determining a size of a gaze region of the human eyes based on the distance and a predetermined vision field of the human eyes; and
  generating the display region adjustment information based on the size of the gaze region of the human eyes and the gaze position of the human eyes, wherein the display region adjustment information is indicative of setting sizes of target display regions in the at least two display regions to be less than or equal to the size of the gaze region of the human eyes, the target display regions being display regions including the gaze position.

Optionally, the method further includes: acquiring information of human eyes of multiple users by the human eye detection assembly in the case that the multiple users view the display apparatus, and determining one of the information of the human eyes of the multiple users as default information of the human eyes; and
  acquiring the display region adjustment information based on the default information of the human eyes.

Optionally, acquiring the information of the human eyes of the multiple users by the human eye detection assembly, and determining one of the information of the human eyes of the multiple users as the default information of the human eyes include:
  acquiring an image by the human eye detection assembly;
  acquiring the information of the human eyes of the multiple users based on the image; and
  determining information of the human eyes closest to a center of the image as the default information of the human eyes.

Optionally, the method further includes:
  adjusting backlight of the display apparatus by local dimming, such that luminance of the at least two display regions is smoothly transitioned.

Optionally, the display face of the display apparatus includes a plurality of backlight zones; and adjusting the backlight of the display apparatus by local dimming includes:
  acquiring a mean value of pixel values in each of the plurality of backlight zones in the display face of the display apparatus;

acquiring a backlight luminance value corresponding to each of the plurality of backlight zones based on the mean value of the pixel values in each of the plurality of backlight zones; and acquiring a target luminance value of each of the plurality of backlight zones by smoothing the backlight luminance value corresponding to each of the plurality of backlight zones by a cubic B-spline curve.

Optionally, the second terminal includes a smart home device, and the status parameter includes at least one of temperature, humidity, power, battery charge level, and wind, monitor parameter, and smart latch status.

Optionally, the at least two pieces of data to be displayed further include video monitor data; and the method further includes:

displaying the video monitor data.

In another aspect of the present disclosure, a display apparatus is provided. The display apparatus includes:

a receiving module, configured to receive at least two pieces of data to be displayed from at least two terminals respectively, wherein the at least two pieces of data to be displayed include screen projection data and status parameters of the at least two terminals; and a displaying module, configured to display the status parameters, and perform a screen projection based on the screen projection data.

In another aspect of the present disclosure, a display device is provided. The display device includes a processor and a memory, wherein the memory stores at least one instruction, at least one program, a code set, or an instruction set, wherein the processor, when loading and executing the at least one instruction, the at least one program, the code set, or the instruction set, is caused to perform the above method for controlling the display apparatus.

In another aspect of the present disclosure, a non-transitory computer storage medium is provided. The non-transitory computer storage medium stores at least one instruction, at least one program, a code set, or an instruction set, wherein the at least one instruction, the at least one program, the code set, or the instruction set, when loaded and executed by a processor, causes the processor to perform the above method for controlling the display apparatus.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

The embodiments of the present disclosure are shown by above accompanying drawings, and clearer description is given hereinafter. The accompanying drawings and description are not intended to limit the scope of the concept of the present disclosure in any means, but illustrate the concept of the present disclosure with reference to specific embodiments.

DETAILED DESCRIPTION

For clearer descriptions of the objectives, technical solutions, and advantages in the present disclosure, the embodiments of the present disclosure are described in detail hereinafter in combination with the accompanying drawings.

In a method for controlling the display apparatus, video content played on a small screen device is simultaneously played with a display apparatus with a large screen by a screen projection to the display apparatus with the large screen, such that an immersive view experience may be achieved by the display apparatus with the large screen.

In the above method, data displayed in the display apparatus is simple.

Figures 1, 2:
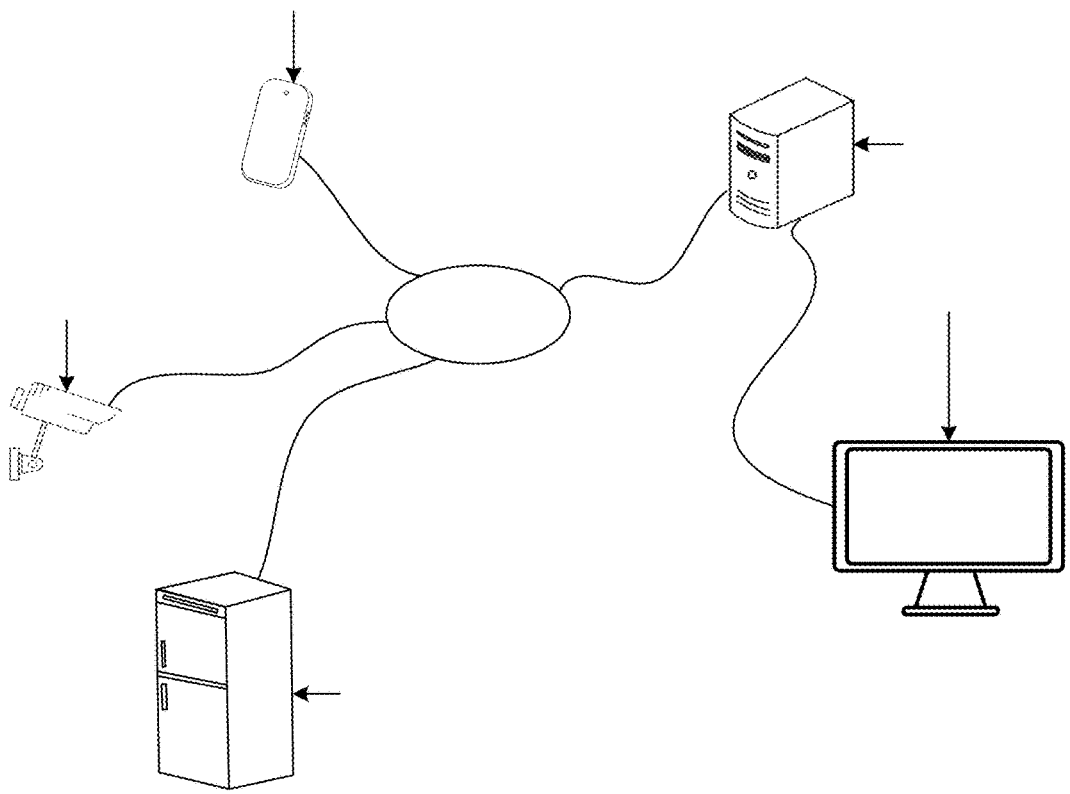
FIG. 1 is a schematic diagram of an application scenario of a method for controlling a display apparatus according to an embodiment of the present disclosure.
FIG. 2 is a flowchart of a method for controlling a display apparatus according to an embodiment of the present disclosure.

FIG. 1 is a schematic diagram of an application scenario of a method for controlling a display apparatus according to an embodiment of the present disclosure. The application scenario may include at least two terminals 11, and a display apparatus 12.

The terminal 11 may include a mobile phone, a tablet computer, a laptop computer, a smart wearable device, a camera, a refrigerator, an air conditioner, an electric rice cooker, and the like.

The display apparatus 12 may be a smart screen, and the display apparatus may include a processor 121. The processor 121 may be disposed in a host of a personal computer, the smart screen, or a peripheral of the smart screen. The host of the personal computer may be configured to process system data, such as a 8K video decoding and rendering, human eyes ranging, screen projection data processing, backlight and screen control, power dissipation data calculating, image data inputting and displaying, camera data processing, and the like.

The smart screen may include a display assembly, a processor assembly, and a peripheral assembly. The display assembly may include a touch unit, an open cell (OC) unit, a light board unit, and a drive board unit. The touch unit may be configured to achieve a screen touch function of the display apparatus. Illustratively, the touch unit in the embodiments of the present disclosure is a 75 inch capacitive touch screen with a size of 1711.6 mm*991.4 mm. A light transmittance of an anti-glare glass in the touch screen within the visible light range (from 380 nm to 780 nm) is greater than 86%, a number of touch points may be 10, and a touch accuracy may be ±2 mm.

The touch unit may be fixed with the open cell in a full attached manner, and the open cell may be configured to achieve a display function of the smart screen. A resolution of the open cell may be 7690*4320, an effective display area of the open cell may be 1650 mm*928 mm, and a refresh rate of the open cell may be 60 Hz.

The light board unit may be configured to generate backlight of the smart screen, and the light-emitting device in the light board unit may be a mini light-emitting diode (LED). The light board unit may be composed of two mini LED back boards. A number of lamps in each of the mini LED back board is 96*108, a number of backlight zones in each of the mini LED back board is 48*54. Each backlight zone is composed of four LED lamps with an achievable luminance range from 0 to 1500 nit.

The drive board unit may include a field programmable gate array (FPGA) control board, a touch control board, a timing controller (TCON) board, and a plurality of connecting boards. The FPGA control board may be configured to convert a digital audio signal output by the PC host into an image information signal and send to a screen drive board, further send to the open cell by the plurality of connecting boards, and display corresponding image content in the open cell.

The screen drive board may be configured to control a timing of signals and convert the signal. The touch control board may be configured to control and send a screen touch signal, and the processed touch signal is sent to the PC host. The PC host, when receiving the touch signal, performs corresponding touch trigger operation on the position of the touch signal, such that a touch effect of the smart screen is achieved.

The smart screen may further include a router assembly configured to generate a local area network to connect a plurality of terminals.

It should be noted that above display assemblies, processor assemblies, and peripheral assemblies may further be other types of assemblies, which are not limited in the embodiments of the present disclosure.

The terminal 11 may be connected to the display apparatus 12 in a wired or wireless fashion. The terminal 11 may output a radio wave configured to send data to the display apparatus 12. Or, the terminal 11 may be not connected to the display apparatus 12.

Application scenarios of the embodiments of the present disclosure may include the follows.

In a home life, the smart screen may display screen projection data output by the mobile phone and the tablet computer, or display status parameters of the smart appliances, such as the refrigerator and the air conditioner (such as, a temperature and power consumption of the refrigerator, a temperature of the air conditioner, a switch status of the electric rice cooker, or the like). The displayed information is diversified, such that the user may realize the operation status of the smart appliances in viewing the videos.

FIG. 2 is a flowchart of a method for controlling a display apparatus according to an embodiment of the present disclosure. The method may be applicable to the display apparatus in the application scenario shown in FIG. 1. The method includes the following processes.

In S201, at least two pieces of data to be displayed from at least two terminals respectively are received, wherein the at least two pieces of data to be displayed include screen projection data and status parameters of the at least two terminals.

In S202, the status parameters are displayed, and a screen projection is performed based on the screen projection data.

In summary, a method for controlling a display apparatus is provided in the embodiments of the present disclosure. In the method, the display apparatus receives at least two pieces of data to be displayed from at least two terminals respectively, wherein the at least two pieces of data to be displayed include screen projection data and the status parameters of the at least two terminals, and then displays the status parameters, and performs a screen projection based on the screen projection data. In this way, the display apparatus may display various data from at least two terminals, and the displayed data is diversified, such that a problem of simple data displayed by the display apparatus in the related art may be solved, and the data displayed by the display apparatus is diversified.

Figure 3:
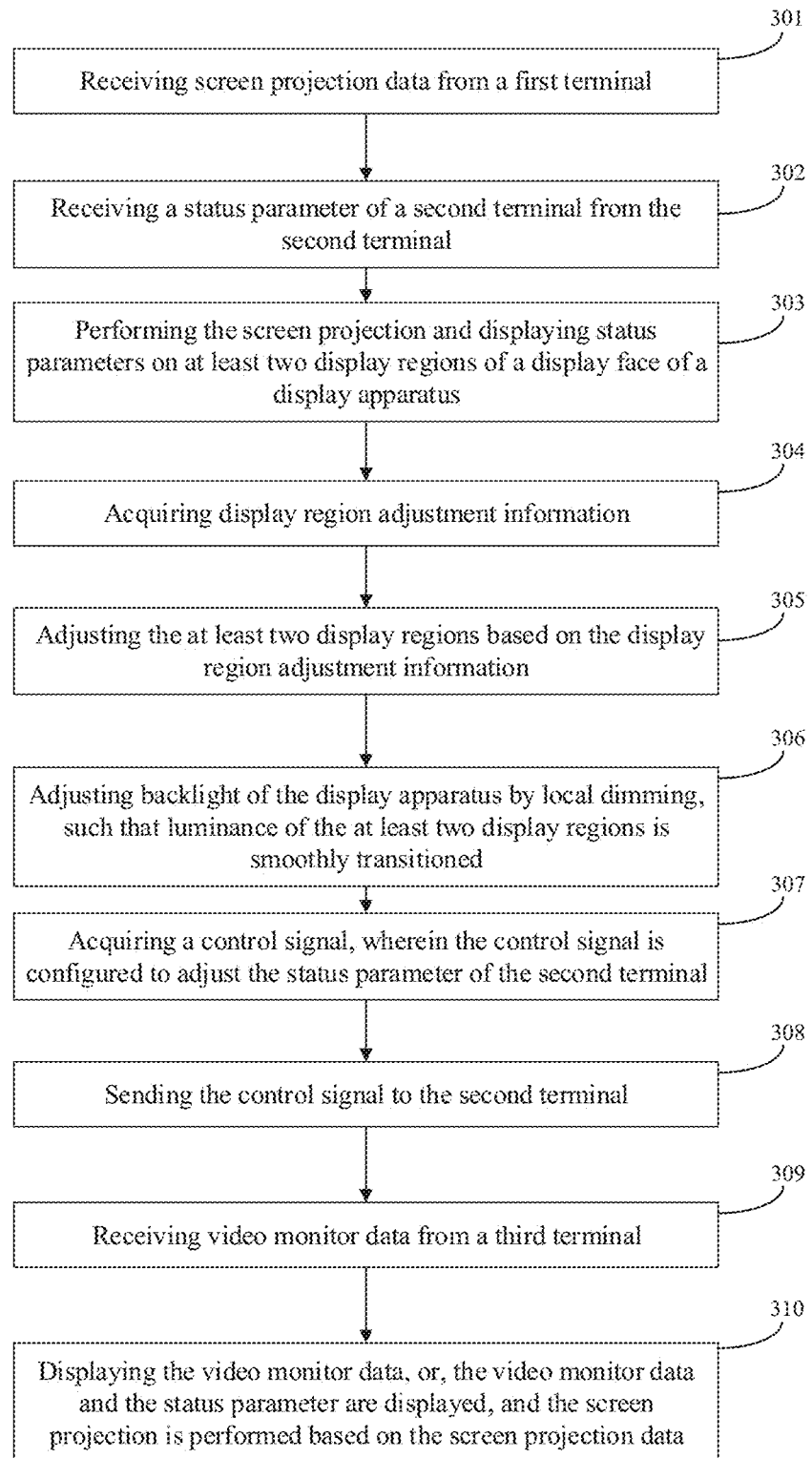
FIG. 3 is a flowchart of another method for controlling a display apparatus according to an embodiment of the present disclosure.

FIG. 3 is a flowchart of another method for controlling a display apparatus according to an embodiment of the present disclosure. The method may be applicable to the display apparatus, and include the following processes.

In S301, screen projection data from a first terminal is received.

The first terminal may be a terminal configured to send the screen projection data. In the embodiments of the present disclosure, the display apparatus may receive the screen projection data from one or more first terminals.

The first terminal may include electronic products, such as a mobile phone, a tablet computer, a laptop computer, and the like. The screen projection data may include audio video data and instructions of the audio video data. The first terminal and the display apparatus may be connected to the same network (such as the same wireless fidelity (WiFi) network) in the wired or wireless fashion, so as to send the screen projection data.

In S302, the status parameter of a second terminal from the second terminal is received.

The second terminal may be a terminal configured to send the status parameter. In the embodiments of the present disclosure, the display apparatus may receive the status parameters from one or more second terminals.

The second terminal may include smart home devices, such as a smart refrigerator, a smart air conditioner, a smart electric rice cooker, and the like. The status parameter may include one of temperature, humidity, power, battery charge level, and wind, monitor parameter, and smart latch status.

The display apparatus and the second terminal may be connected to the same network in the wired or wireless fashion, and the display apparatus may receive the status parameter from the second terminal in the wired or wireless fashion. Or, the display apparatus may receive the status parameter from the second terminal in a broadcast fashion, which is not limited in the embodiments of the present disclosure.

In S303, the screen projection is performed and the status parameter is displayed on at least two display regions of a display face of the display apparatus respectively.

The display face may include a screen projection display window and a status parameter display window. The screen projection display window may include one or more display regions of the screen projection data, and screen projection content is displayed based on the one or more screen projection data through the one or more display regions of the screen projection data. The status parameter display window may include one or more display regions of status parameters, and the one or more status parameters are displayed through the one or more display regions of status parameters.

Figure 4:
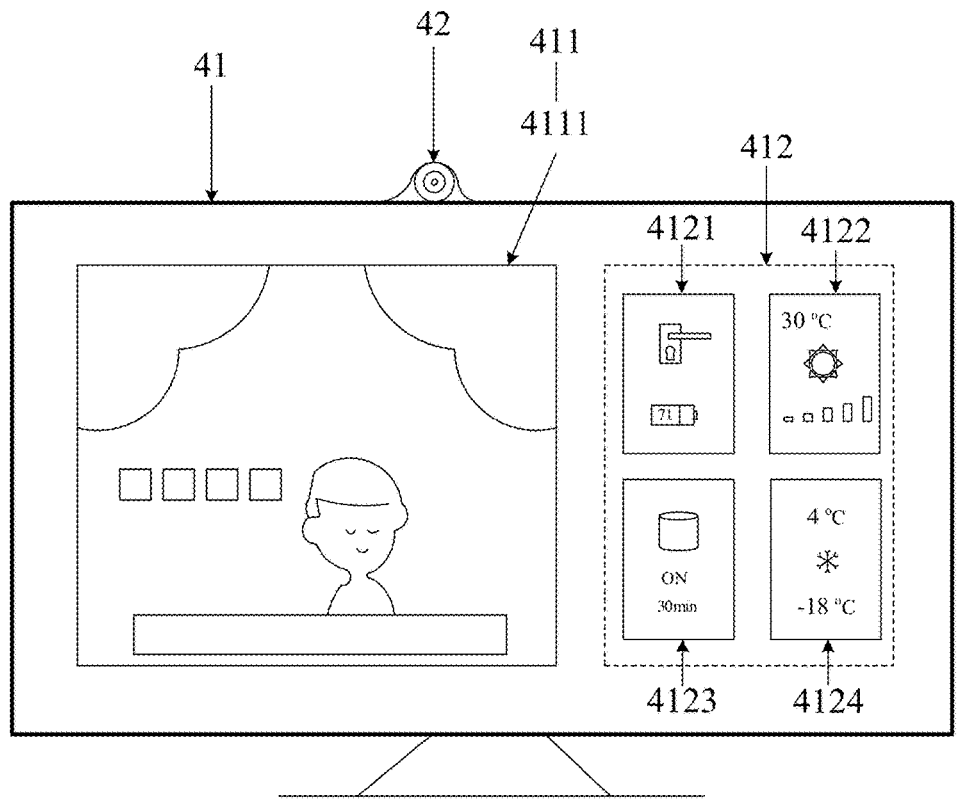
FIG. 4 is a schematic diagram of a display face of a display apparatus according to an embodiment of the present disclosure.

As shown in FIG. 4, FIG. 4 is a schematic diagram of a display face of a display apparatus according to an embodiment of the present disclosure. The display face 41 of the display apparatus may include a screen projection display window 411 and a status parameter display window 412. A screen projection display region 4111 of the screen projection display window 411 may be performed on the screen projection based on the screen projection data from the first terminal, and may directly receive the screen projection data displayable on the display face in screen projection, or receive an instruction of at least one screen projection data from the first terminal. Illustratively, the instruction may include a link of audio video data to be screen projected, and the display apparatus may perform the screen projection based on the link, such that the first terminal may close or perform other operations to improve the use experience of the user.

Four display regions of the status parameters in the status parameter display window 412 may be configured to display the status parameters from the second terminal. As the second terminal may include a plurality of smart home devices, the display apparatus may receive a plurality of status parameters of the plurality of smart home devices, and the plurality of status parameters may be displayed on the status parameter display window 412 in a tabular form. The status parameter display window 412 includes a display region of the smart latch status parameter 4121, a display region of the smart air conditioner status parameter 4122, a display region of the smart electric rice cooker status parameter 4123, and a display region of the smart refrigerator status parameter 4124.

In S304, display region adjustment information is acquired.

The display apparatus may include a human eye detection assembly. As shown in FIG. 4, the human eye detection assembly may include a camera 42 and a face detection unit. The camera 42 may be configured to acquire an face image of the user viewing the display apparatus. Illustratively, a resolution of the camera 42 may be 640*480, a field of view (FOV) may be 120°, and a frame rate may be 60 Hz. The face detection unit may be configured to extract face information in the face image photographed by the camera, so as to detect the human eye information.

The display face of the display apparatus may include a human eye detection control switch button configured to turn on or turn off the human eye detection assembly.

The display region adjustment information may include adjustment information, such as a position, a size, a display effect of the display region in the display apparatus, and the like.

It is noted that, when the users views the display apparatus with a larger screen, visible ranges of the users in different distances may be different due to the vision field of the human eyes, and a visible angle and size of the screen. In the case that the human eye detection assembly is turned on, the display apparatus may acquire the distance between the human eyes and the display apparatus by the human eye detection assembly, or acquire the distance between the human eyes and the display apparatus, and relative positions of the human eyes and the display apparatus, and acquire display region adjustment information in combination with the visual characteristic of human eyes, that is, a comfortable vision field of the human eyes, such that the user may view the whole display region comfortably. Therefore, a case that the user cannot view the whole display region of the display apparatus in a scenario of a closer distance between the user and the display apparatus (such as a scenario of performing a touch operation on the display apparatus by the user) may be avoided.

Optionally, information of human eyes of multiple users may be acquired by the human eye detection assembly in the case that the multiple users view the display apparatus, and one of the information of the human eyes of multiple users is determined as default information of the human eyes. The display region adjustment information may be acquired based on the default information of the human eyes.

That is, in the case that the multiple users view the display apparatus simultaneously, one user may be selected from the multiple users, and the display region adjustment information may be acquired based on the information of the human eyes of the one user.

Acquiring the information of human eyes of multiple users by the human eye detection assembly, and determining one of the information of the human eyes of multiple users as the default information of the human eyes may include the following processes.

1) an image is acquired by the human eye detection assembly.

The image of the multiple users viewing the display apparatus may be acquired by the camera in the human eye detection assembly, and the image includes face images of the multiple users.

2) the information of human eyes of multiple users is acquired based on the image.

Face information of in a plurality of face images in the image is extracted by the face detection unit in the human eye detection assembly, and the information of human eyes of multiple users in the image is further acquired.

Illustratively, the information of human eyes may include coordinates information of human eyes in the image. The image acquired by the camera is in a shape of a rectangle. Coordinates of four corners of the rectangular image may be (0, 0), (0, 2x), (0, 2y), and (2x, 2y), coordinates of the center of the rectangular image may be (x, y), and coordinates of the acquired information of the human eyes of the multiple users may be (x1, y1), (x2, y2), and (x3, y3).

3) information of the human eyes closest to a center of the image is determined as the default information of the human eyes.

Illustratively, an absolute value of a difference value of each of the information of human eyes and a abscissa of the center of the image is acquired and determined as a first difference value. The first difference value is a lateral distance between each of the information of human eyes and the center of the image. The lateral direction may be a direction parallel to a horizontal axis.

An absolute value of a difference value of each of the information of human eyes and ordinate of the center of the image is acquired and determined as a second difference value. The second difference value is a longitudinal distance between each of the information of human eyes and the center of the image. The longitudinal direction may be a direction parallel to a vertical axis.

A sum of the first difference value and the second difference value is taken determined as the difference value of each of the information of human eyes and the center of the image, and the difference value may be configured to represent the distance of each of the information of human eyes and the center of the image.

The information of the human eyes with a smallest difference value in the information of human eyes of multiple users may be taken as the default information of the human eyes, that is, the information of the human eyes closest to the center of the image is determined as the default information of the human eyes.

The method of acquiring the display region adjustment information may include the following two fashions.

In a first fashion, the display region adjustment information may be determined by acquiring the distance between the human eyes and the display apparatus, and the comfortable vision field of the human eyes in viewing the screen. It should be noted that, the human eyes may be the human eyes of the one user viewing the screen in the case that one user views the display apparatus, and the human eyes may be the human eyes of the users viewing the screen in the case that multiple users view the display apparatus.

Figure 5:
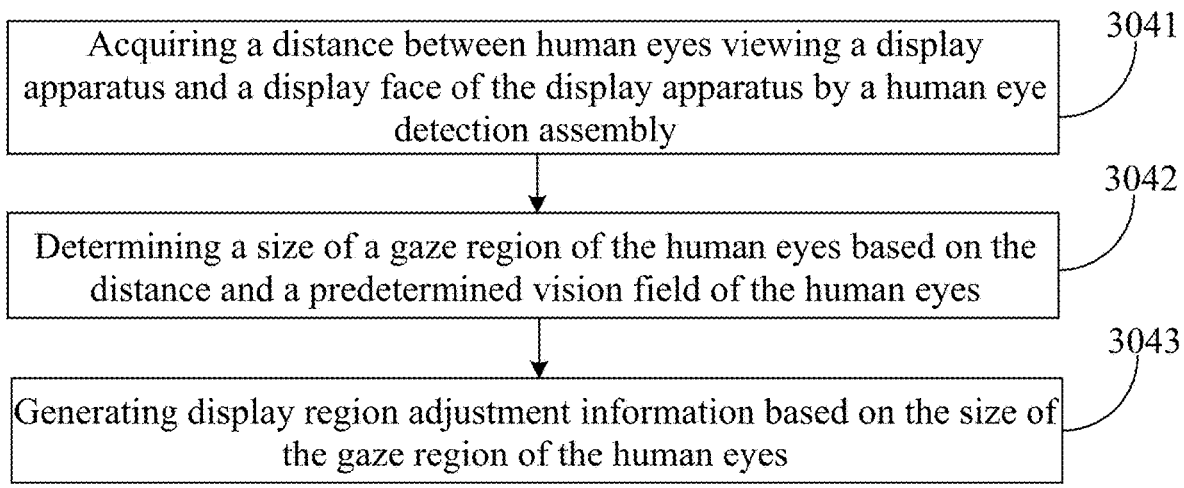
FIG. 5 is a flowchart of a method of acquiring display region adjustment information in the method shown in FIG. 3.

As shown in FIG. 5, S304 may include the following three sub-steps.

In sub-step 3041, the distance between the human eyes viewing the display apparatus and the display face of the display apparatus is acquired by the human eye detection assembly.

Sub-step 3041 may include the following processes.

1) a first distance between the face of the user viewing the display apparatus and the display face of the display apparatus is acquired.

The display apparatus may photograph the face images viewing the display apparatus by the camera. The face detection unit acquires a face region in the image based on the face image, and performs a facial landmark detection on the acquired face region, and the facial landmark detection may position the landmark points in the face, such as, a mouth corner, an eye-corner. The first distance between the face and the display face of the display apparatus is acquired using a perspective-n-point (PnP) algorithm. Illustratively, a number of the detected landmark points is 68, the first distance between the face and the display face of the display apparatus is acquired using the PnP algorithm based on a standard 3D face template pre-stored in the PnP algorithm and coordinates information of detected 68 2D face landmark points.

2) the distance between the human eyes and the display face is acquired. The distance may be a perpendicular distance between the human eyes and the display face.

The process of acquiring the distance between the human eyes and the display face may include the following processes.

2.1 image coordinates of human eyes are acquired based on the face image, that is, human eyes regions are extracted based on the face image. Illustratively, a periphery of each eye includes six landmark points. For a left eye, a mean value of six landmark points in the periphery of the left eye is calculated and taken as coordinates of the left eye in the face image, and the right eye is performed with the same method, such that the image coordinates of two eyes are acquired. In this way, the coordinates of the human eyes may be determined more accurately.

2.2 coordinates of the human eyes in the world coordinate system are acquired based on the image coordinates of the human eyes.

A conversion formula of the coordinates of the human eyes in the world coordinate system and the image coordinates of the human eyes may be:

$$Z_{C1}\begin{bmatrix}u_{c1}\\v_{c1}\\1\end{bmatrix}=\begin{bmatrix}f_{x1}&0&u_1&0\\0&f_{y1}&v_1&0\\0&0&1&0\end{bmatrix}\begin{bmatrix}R_1&T_1\\\vec{0}&1\end{bmatrix}\begin{bmatrix}x_w\\y_w\\z_w\\1\end{bmatrix}.$$

$Z_{C1}$ represents the first distance between the face and the display face of the display apparatus, $(u_{c1}, V_{c1})$ represents coordinates of the human eyes in the face image, $$\begin{matrix}f_{x1}&0&u_1&0\\0&f_{y1}&v_1&0\\0&0&1&0\end{matrix}$$

represents coordinates of parameters of the camera, $$\begin{matrix}R_1&T_1\\\vec{0}&1\end{matrix}$$

represents a relationship matrix of converting the coordinates of the camera and the world coordinate system, and $(x_w, y_w, z_w)$ represents the coordinates of the human eyes in the world coordinate system.

A point (such as, the top left corner, or the center) in the display face of the display apparatus may be taken as an origin of the world coordinate system to establish the world coordinate system (a x direction is perpendicular to a y direction, the x direction is parallel to a plane of the y direction and a plane of the display face, and a plane of a z direction is perpendicular to the plane of the display face). Based on the coordinates of the human eyes in the face image, coordinates zw of the human eyes in the z direction in the world coordinate system may be acquired, and two coordinates zw1 and zw2 of the left eye and the right eye in the z direction in the world coordinate system may be acquired.

2.3 distances D1 and D2 between the two eyes and the display face may be acquired based on the coordinates zw1 and zw2 of the left eye and the right eye in the world coordinate system, and a mean value of D1 and D2 between the two eyes and the display face is taken as the distance D between the human eyes and the display face.

In some exemplary embodiments, the first distance between the face and the display face of the display apparatus is taken as the distance between the human eyes and the display face, so as to reduce the calculation amount.

In sub-step 3042, a size of a gaze region of the human eyes is determined based on the distance between the human eyes and the display face and a predetermined vision field of the human eyes.

The predetermined vision field of the human eyes may be a gaze range of the human eyes in a predetermined angle. Illustratively, the predetermined angle may be an included angle of line-of-sight of the gazes of the human eyes in one direction. In the case that the predetermined angle is unchanged, distances between different human eyes and the display face may correspond to different sizes of the gaze regions of the human eyes.

The predetermined angle may include an included angle of line-of-sight of the gazes of the human eyes in a horizontal direction and an included angle of line-of-sight of the gazes of the human eyes in a vertical direction.

Figure 6:
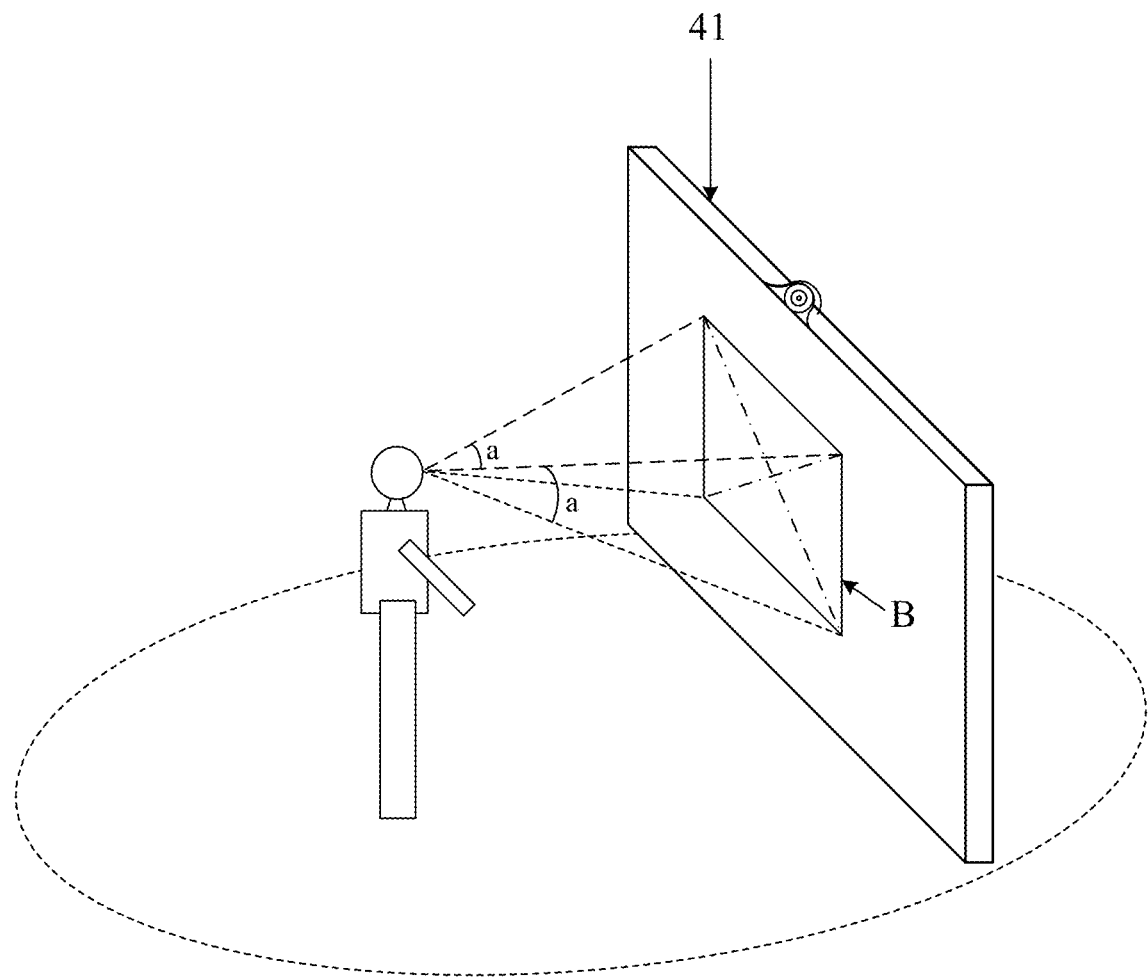
FIG. 6 is a schematic diagram of determining a vision field of human eyes according to an embodiment of the present disclosure.

As shown in FIG. 6, FIG. 6 is a schematic diagram of determining a vision field of human eyes according to an embodiment of the present disclosure. Illustratively, both predetermined angles in the horizontal direction and in the vertical direction are 60°, the size of the vision field of the human eyes is determined based on the distance between the human eyes and the display face and the predetermined angle of the human eyes.

Figure 7:
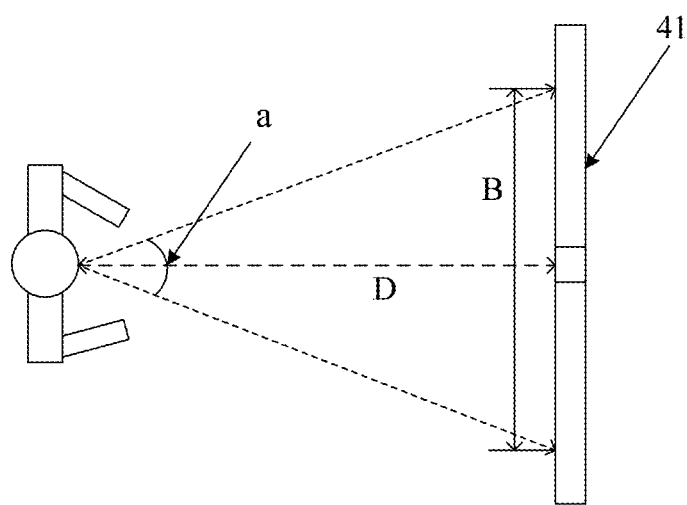
FIG. 7 is a top view of determining the vision field of the human eyes shown in FIG. 6.

As shown in FIG. 7, FIG. 7 is a top view of determining the vision field of the human eyes shown in FIG. 6. In the case that the display region of the display apparatus is in a shape of a rectangle, based on the distance D and the predetermined angle 60°, an edge length B of the predetermined vision field of the human eyes in the plane of the display region is 2*tan 30°*D in the case that the human eye is the center, a perpendicular line between the human eye and the display face is a reference, and an included angle of the line-of-sight of the human eye and the perpendicular line is half of the predetermined angle. The shape of the predetermined vision field of the human eyes may be a square, and any edge of the square is parallel to the longer edge or shorter edge of the display region.

It should be noted that, the predetermined angle in the horizontal direction and in the vertical direction may be other values. For example, the predetermined angle in the horizontal direction may be 57°, and the predetermined angle in the vertical direction may be 48°, which is not limited in the embodiments of the present disclosure.

In sub-step 3043, the display region adjustment information is generated based on the size of the gaze region of the human eyes.

The display region adjustment information is configured to ensure that sizes of at least two display regions are less than or equal to the size of the gaze region of the human eyes, such that the user viewing the display region may view the whole display region without turning the hand or adjusting the direction of the eyes. That is, the size of the display region is adjusted based on the size of the gaze region of the human eyes, such that the viewing fatigue caused by the frequent turn of the hand of the user viewing the display region for greater view experience may be avoided, and the view experience of the user may be improved.

Figure 8:
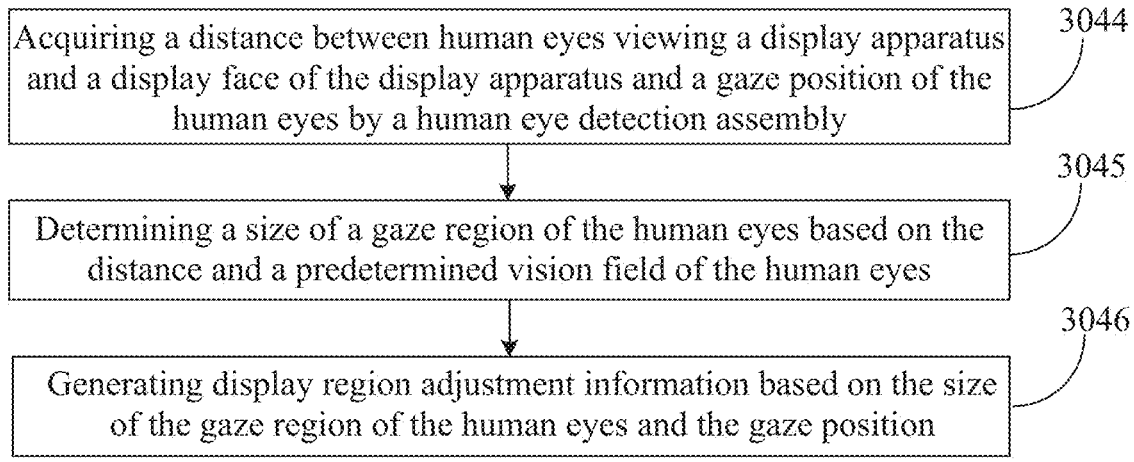
FIG. 8 is a flowchart of another method of acquiring display region adjustment information in the method shown in FIG. 3.

In a second fashion, the display region adjustment information may be determined by acquiring the distance between the human eyes and the display apparatus, and a gaze position of the human eyes. As shown in FIG. 8, S304 may include the following three sub-steps.

In sub-step 3044, the distance between the human eyes viewing the display apparatus and the display face of the display apparatus, and the gaze position of the human eyes are acquired by the human eye detection assembly.

By acquiring the distance between the human eyes and the display face and the gaze position of the human eyes, the display region of the display face may be matched with the view position of the user more accurately.

The embodiments for acquiring the distance between the human eyes and the display face of the display apparatus may be referred to the embodiments of S3041, which is not repeated in the embodiments of the present disclosure.

The camera may be used to photograph the face images viewing the display apparatus to acquire the gaze position of the human eyes, a position of pupil of the viewer and a face gesture are acquired based on the face image, and the gaze position of the human eyes is acquired based on the position of the pupil and the face gesture.

In sub-step 3045, the size of the gaze region of the human eyes is determined based on the distance and a predetermined vision field of the human eyes.

The embodiments of S3045 may be referred to the embodiments of S3042, which is not repeated in the embodiments of the present disclosure.

In sub-step 3046, the display region adjustment information is generated based on the size of the gaze region of the human eyes and the gaze position.

The display region adjustment information is configured to ensure that sizes of target display regions in at least two display regions are less than or equal to the size of the gaze region of the human eyes, the target display regions are display regions including the gaze position, such that the user viewing the display region may view the whole display region without adjusting the direction of the eyes or turning the hand. By acquiring the gaze region of the human eyes, the display region viewed by the viewer may be determined, and the display region is determined as the target region, such that the display region of the display apparatus may be matched with the requirements of the viewer.

In the first fashion, the display region adjustment information is generated based on the size of gaze region of the human eyes, and the display region of the display face may be adjusted in the entirety. In the second fashion, the display region adjustment information is generated based on the size of gaze region of the human eyes and the gaze position, the display region gazed by the human eyes may be adjusted merely, and other regions may be correspondingly adjusted.

In S305, the at least two display regions are adjusted based on the display region adjustment information.

The sizes of the at least two display regions are adjusted based on the display region adjustment information, and the at least two display regions are not overlapped with each other.

In S306, backlight of the display apparatus is adjusted by local dimming, such that luminance of the at least two display regions is smoothly transitioned.

The backlight of the display apparatus is adjusted by local dimming, such that locally dimmed backlight data is more smooth, and the display regions with different luminance are transitioned more naturally. Therefore, the display region is more comfortable with the view effect of the human eyes, and the flicker in changing images may be reduced.

Figure 9:
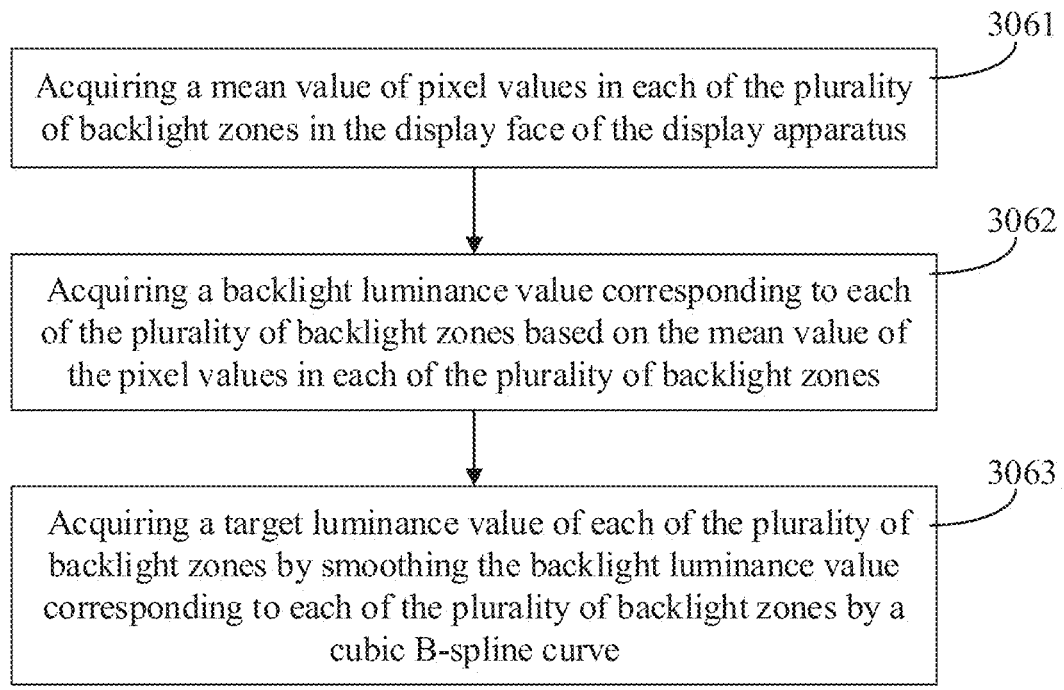
FIG. 9 is a flowchart of a method of adjusting backlight in the method shown in FIG. 3.

The display face of the display apparatus may include a plurality of backlight zones. As shown in FIG. 9, S305 may include the following three sub-steps.

In sub-step 3061, a mean value of pixel values in each of the plurality of backlight zones in the display face of the display apparatus is acquired.

Figure 10:
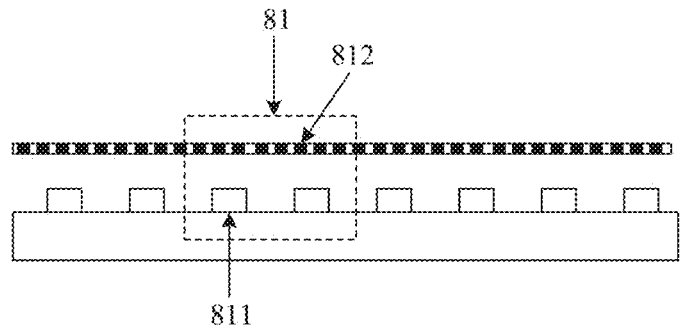
FIG. 10 is a cross-sectional schematic diagram of a backlight zone according to an embodiment of the present disclosure.

The display face of the display apparatus may include the plurality of backlight zones, and each of the plurality of backlight zones may include a plurality of pixels. Pixels values of the plurality of pixels may be different, and the mean value of the pixel values in each of the plurality of backlight zones may be taken as the pixel value of the backlight zone. As shown in FIG. 10, FIG. 10 is a cross-sectional schematic diagram of a backlight zone according to an embodiment of the present disclosure. Each backlight zone 81 may include a plurality of light emitting units 811 (such as, a mini LED), and each light emitting unit 811 may correspond to a plurality of pixels 812.

Illustratively, the display region in the embodiments of the present disclosure includes 96*54 backlight zones, the size of the display region is 1650 mm*928 mm, a sum of areas of the backlight zones is equal to an area of the display region. Each backlight zone includes 1600 pixels, a mean pixel values of 1600 pixels in each backlight zone is calculated and taken as the pixel value of the backlight zone.

Optionally, as the difference value of pixel values of adjacent pixels is small, a sum of the pixel values may be calculated between pixels spaced apart two pixels, the calculated sum of the pixel value is averaged to acquire the mean pixel value, and the acquired mean pixel value is the pixel value corresponding to the zone, such that the calculation rate is improved.

In sub-step 3062, a backlight luminance value corresponding to each of the plurality of backlight zones is acquired based on the mean value of the pixel values in each of the plurality of backlight zones.

The mean value of the pixel values in the backlight zone may be positively correlated with the backlight luminance value corresponding to the backlight zone. It should be noted that, the positive correlation indicates the same variation direction of two variates. In the case that one variate varies from small to large, the other variate varies from small to large.

Illustratively, the gradation value of the pixel ranges from 0 to 255, and the backlight luminance value ranges from 0 to 63. That is, the variation of the gradation value of the pixel is 256 scales, and the variation of the backlight is 64 scales. Each four the gradation values of the pixel correspond to one backlight luminance value, and the mapping relationship is shown in Table 1.

TABLE 1

Corresponding relationship of gradation values of a pixel and a backlight luminance value

| Gradation values of a pixel | Backlight luminance value |
| --- | --- |
| (0, 3) | 0 |
| (4, 7) | 1 |
| (8, 11) | 2 |
| . . . | . . . |
| (251, 255) | 63 |

In sub-step 3063, a target luminance value of each of the plurality of backlight zones is acquired by smoothing the backlight luminance value corresponding to each of the plurality of backlight zones by a cubic B-spline curve.

A plurality of backlight luminance values may be acquired by above method. The backlight luminance values are acquired by calculating the mean pixel values, and the backlight luminance value corresponding to each of the plurality of backlight zones is smoothed by the cubic B-spline curve, such that a hop of the backlight luminance values of adjacent backlight zones may be avoided. That is, the flicker in viewing the screen by the user caused by not smooth change of the backlight luminance values of adjacent backlight zones may be avoided.

A cubic B-spline curve equation is:

$$P(t)=P_n*F_{0,3}(t)+P_{n+1}*F_{1,3}(t)+P_{n+2}*F_{2,3}(t)+P_{n+3}*F_{3,3}(t).$$

Illustratively, $P(t)=P_0*F_{0,3}(t)+P_1*F_{1,3}(t)+P_2*F_{2,3}(t)+P_3*F_{3,3}(t)$.

$$F_{0,3}(t) = \frac{1}{6}(1-t)^3.$$

$$F_{1,3}(t) = \frac{1}{6}(3t^3 - 6t^2 + 4)$$

-continued $$F_{2,3}(t) = \frac{1}{6}(-3t^3 + 3t^2 + 3t + 1).$$

$$F_{3,3}(t) = \frac{1}{6}t^3.$$

P(t) represents a fitted value by the cubic B-spline curve, t represents a abscissa or ordinate of the backlight zone, $P_n$, $P_{n+1}$, $P_{n+2}$, and $P_{n+3}$ represent backlight luminance values of four adjacent backlight zones that are arranged laterally or longitudinally (n=0, 1, 2, 3 . . . n+1, and n is a number of the abscissae or ordinate of the backlight zone), and $F_{n,3}(t)$ represents a function based on the cubic B-spline curve. A row fitted value and a column fitted value of each zone may be acquired by the cubic B-spline curve equation, a mean value of the row fitted value and the column fitted value of the zone is acquired based on the row fitted value and the column fitted value of each zone, and the mean value is taken as the target luminance value of each zone.

Illustratively, the display region in the embodiments of the present disclosure includes 96*54 backlight zones, and the backlight zones in the display region are arranged laterally and longitudinally. The lateral direction is perpendicular to the longitudinal direction. A number of values calculated by the cubic B-spline curve may be two less than a number of output values. Therefore, for acquiring a fitted value of the 96 lateral backlight zones by fitting, each of lateral edges of the display region is added to one column of virtual backlight zone (a total of 98 columns of backlight zones), so as to acquire a fitted value of the edges of the lateral backlight zones. Backlight luminance value of the added one column of virtual backlight zone is the backlight luminance value of the adjacent backlight zone. Based on the display region added with virtual backlight zones, a coordinate system is established by taking the top left corner of the display region as an origin, and coordinates of the backlight zone is represented by center coordinates of each backlight zone.

The row fitted value of each backlight zone is calculated based on the abscissae of the backlight zone and backlight luminance value of the backlight zone, and the column fitted value of each zone is further calculated based on the above calculation process.

Each backlight zone corresponds to one row fitted value and one column fitted value, a mean value of the row fitted values and the column fitted valued is calculated based on row fitted values and column fitted values corresponding to the backlight zones, and the mean value is taken as the target luminance value of each backlight zone.

In S307, a control signal is acquired, wherein the control signal is configured to adjust the status parameter of the second terminal.

The display apparatus may acquire a plurality of control signals, and adjust the status parameters of the plurality of second terminals based on the plurality of control signals. Illustratively, the display apparatus may acquire the control signal based on operations of the user on the display face, or, the display apparatus may acquire the control signal by the mobile phone based on operations of the user on the mobile phone.

In S308, the control signal is sent to the second terminal.

The display apparatus may control the operation status of the second terminal by sending the control signal to the second terminal. Illustratively, the user may control the temperature and the switch of the air condition by the display apparatus.

In S309, video monitor data from a third terminal is received.

At least two pieces of data to be displayed further include the video monitor data, and the display apparatus further include a monitor assembly. The video monitor data may be acquired by the monitor assembly, and the monitor assembly may include a RGB camera and an infrared camera that may be configured to acquire monitor videos of the monitor region in daily and night.

In S310, the video monitor data is displayed, or, the video monitor data and the status parameter are displayed, and the screen projection is performed based on the screen projection data.

The video monitor data is displayed on the display face of the display apparatus. Or, the screen projection, the status parameter, and the video monitor data are displayed on at least three display regions of the display face of the display apparatus respectively. The display apparatus may achieve the simultaneous display of the screen projection, the status parameters, and the video monitor data on different display regions of the same display face. Positions and sizes of the display regions may be adjusted based on a touch function of the display apparatus.

The display apparatus may further include a note writing unit configured to achieve a note writing function and record important events. The note writing unit may include functions of setting colors of writing and thickness, fixing a position of the note, and adjusting a size, and the display face includes a display region of the note.

The display apparatus may further include a power displaying unit configured to display current power of the machine, and the display face includes a power display region. Illustratively, the display of the power ranges from 0 to 500 W (power of the display apparatus ranges from 0 to 450 W), different colors are displayed based on values of the power. A range from 0 to 200 W corresponds to green, a range from 200 W to 350 W is progressively changed to yellow, a range from 350 W to 500 W is progressively changed to red. A display precision is 1°, and the value of the power is refreshed each 0.5 s. Optionally, the power displaying unit may be configured to display a power of the second terminal.

In summary, a method for controlling a display apparatus is provided in the embodiments of the present disclosure. In the method, the display apparatus receives at least two pieces of data to be displayed from at least two terminals respectively, wherein the at least two pieces of data to be displayed include screen projection data and the status parameters of the at least two terminals, and then displays the status parameter, and performs a screen projection based on the screen projection data. In this way, the display apparatus may display various data from at least two terminals, and the displayed data is diversified, such that a problem of simple data displayed by the display apparatus in the related art may be solved, and the data displayed by the display apparatus is diversified.

In some exemplary embodiments, another application scenario of a method for controlling a display apparatus is provided in the embodiments of the present disclosure. The application scenario may be a home of the user, and may include various terminals, such as a mobile phone, a smart refrigerator, a smart air conditioner, and the display apparatus described in the above embodiments. The display apparatus may include a smart screen.

When using the smart screen, the user may send screen projection data to the smart screen by the mobile phone, and the smart screen may display based on the screen projection data. Illustratively, in the case that the user watches a television serial by the mobile phone and wants to screen project the television serial watched by the mobile phone on the smart screen, the user may send video screen projection data to the smart screen by the mobile phone, and the video screen projection data may be played on the smart screen. The user may further send a video link of the television serial being watched to the smart screen, the link may be clicked, and the television serial may be played on the smart screen.

The smart screen may further receive status parameters from the smart air conditioner and the smart electric rice cooker, and display the status parameters on the display face. For example, the user may view the current temperature of the smart air conditioner, and a boot time and operation mode of the smart electric rice cooker from the smart screen, such that the user may realize the operation status of the smart appliances timely.

In addition, the user may send the control signal to the mobile phone, the smart air conditioner, and the smart refrigerator by the smart screen, so as to remotely control the mobile phone, the smart air conditioner, and the smart refrigerator. Illustratively, in the case that the user feels hot in a room in watching a television serial, the user may send an air conditioner control signal to the smart screen by the mobile phone, or directly operate on the smart screen to input the air conditioner control signal, and the smart screen may control the switch, the temperature, and the wind level of the air conditioner by the air conditioner control signal. In the case that the user wants to drink an ice beverage, the user may send a refrigerator control signal to the smart screen by the mobile phone, or directly operate on the smart screen to input the refrigerator control signal, and the smart screen may control the temperature of the refrigerator by the refrigerator control signal.

Figure 11:
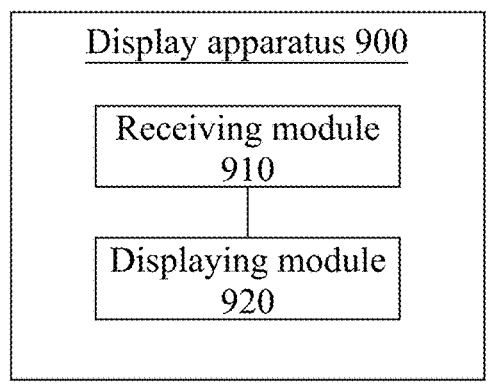
FIG. 11 is a structural block diagram of a display apparatus according to an embodiment of the present disclosure.

FIG. 11 is a structural block diagram of a display apparatus according to an embodiment of the present disclosure, and the display apparatus 900 includes:

a receiving module 910, configured to receive at least two pieces of data to be displayed from at least two terminals respectively, wherein the at least two pieces of data to be displayed include screen projection data and status parameters of the at least two terminals; and a displaying module 920, configured to display the status parameters, and performing a screen projection based on the screen projection data.

In summary, the display apparatus in the embodiments of the present disclosure receives at least two pieces of data to be displayed from at least two terminals respectively, wherein the at least two pieces of data to be displayed include screen projection data and the status parameters of the terminals, and then displays the status parameter, and performs a screen projection based on the screen projection data. In this way, the display apparatus may display various data from at least two terminals, and the displayed data is diversified, such that a problem of simple data displayed by the display apparatus in the related art may be solved, and the data displayed by the display apparatus is diversified.

Optionally, the display apparatus further includes:

a control signal acquiring module, configured to acquire a control signal, wherein the control signal is configured to adjust the status parameter of the second terminal; and a control signal sending module, configured to send the control signal to the second terminal;

an adjustment information acquiring module, configured to acquire display region adjustment information; and an adjusting module, configured to adjust the at least two display regions based on the display region adjustment information.

a backlight adjusting module, configured to adjust backlight of the display apparatus by local dimming, such that luminance of the at least two display regions is smoothly transitioned.

Optionally, the receiving module includes:

a screen projection data receiving unit, configured to receive the screen projection data from a first terminal; and a status parameter receiving unit, configured to receive the status parameter of a second terminal from the second terminal.

Optionally, the displaying module includes:

at least two displaying units, configured to perform the screen projection and display the status parameters on at least two display regions of a display face of the display apparatus respectively.

Optionally, the display apparatus includes a human eye detection assembly, and the adjustment information acquiring module includes:

a first acquiring unit, configured to acquire a distance between human eyes viewing the display apparatus and the display face of the display apparatus by the human eye detection assembly;

a first determining unit, configured to determine a size of a gaze region of the human eyes based on the distance and a predetermined vision field of the human eyes; and a first adjustment information generating unit, configured to generate the display region adjustment information based on the size of the gaze region of the human eyes, wherein the display region adjustment information is indicative of setting sizes of the at least two display regions to be less than or equal to the size of the gaze region of the human eyes.

Or, the adjustment information acquiring module includes:

a second acquiring unit, configured to acquire a distance between human eyes viewing the display apparatus and the display face of the display apparatus and a gaze position of the human eyes by the human eye detection assembly;

a second determining unit, configured to determine a size of a gaze region of the human eyes based on the distance and a predetermined vision field of the human eyes; and a second adjustment information generating unit, configured to generate the display region adjustment information based on the size of the gaze region of the human eyes and the gaze position of the human eyes, wherein the display region adjustment information is indicative of setting sizes of target display regions in the at least two display regions to be less than or equal to the size of the gaze region of the human eyes, the target display regions being display regions including the gaze position.

Optionally, the backlight adjusting module includes:

a mean value acquiring unit, configured to acquire a mean value of pixel values in each of the plurality of backlight zones in the display face of the display apparatus;

a backlight luminance value acquiring unit, configured to acquire a backlight luminance value corresponding to each of the plurality of backlight zones based on the mean value of the pixel values in each of the plurality of backlight zones; and a target luminance value acquiring unit, configured to acquire a target luminance value of each of the plurality of backlight zones by smoothing the backlight luminance value corresponding to each of the plurality of backlight zones by a cubic B-spline curve.

A display device is provided in the embodiments of the present disclosure, and the display device includes a processor and a memory. The memory stores at least one instruction, at least one program, a code set, or an instruction set. The processor, when loading and executing the at least one instruction, the at least one program, the code set, or the instruction set, is caused to perform the method for controlling the display apparatus according to any one of above embodiments.

Figure 12:
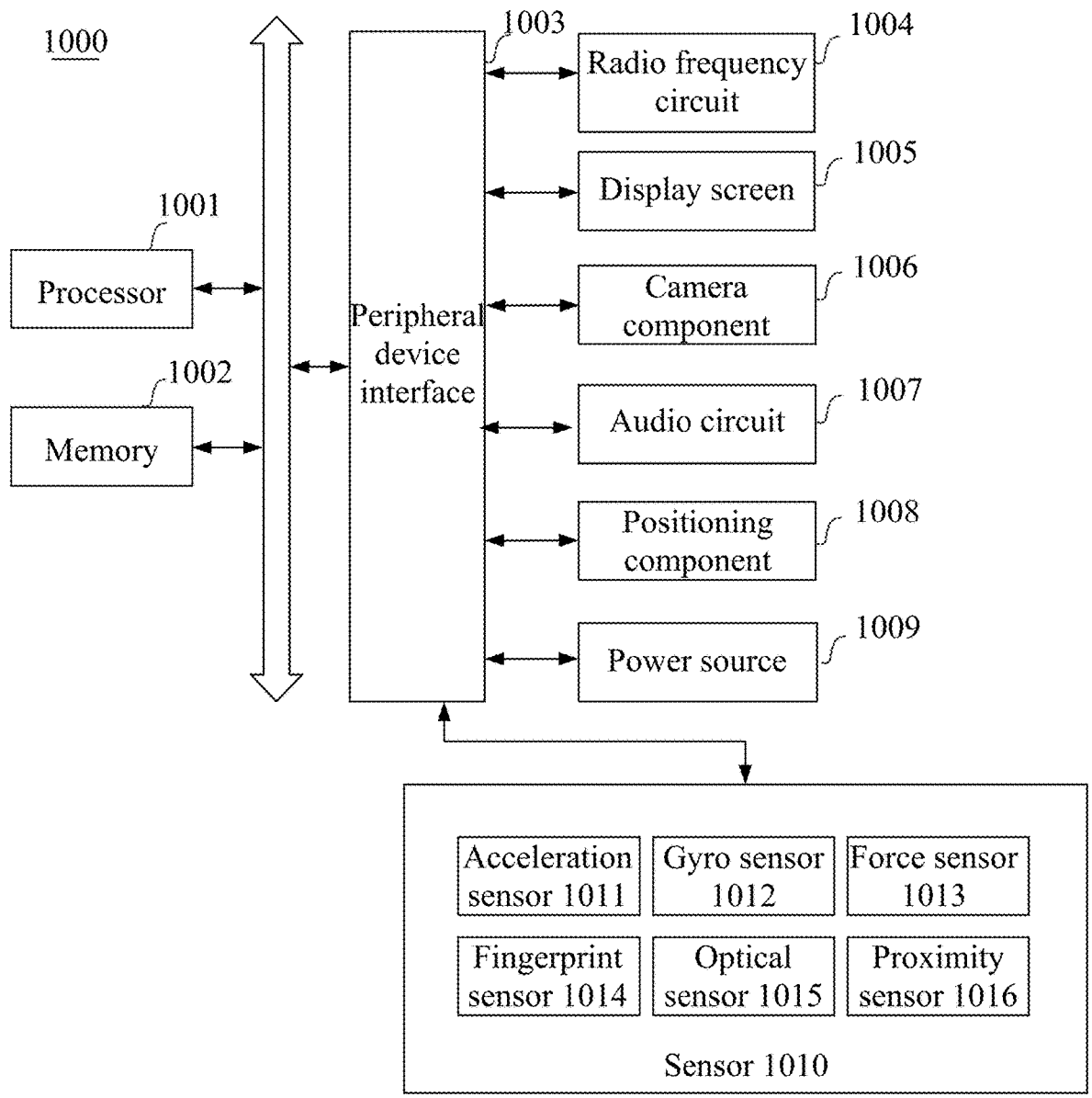
FIG. 12 is a structural block diagram of a display device according to an embodiment of the present disclosure.

FIG. 12 is a structural block diagram of a display device 1000 according to an embodiment of the present disclosure. The display device 1000 may be a smart screen, a television, a laptop, or desk computer.

Generally, the display device 1000 includes a processor 1001 and a memory 1002.

The processor 1001 may include one or more processing cores, such as a 4-core processor, and an 8-core processor. The processor 1001 may be implemented by at least one hardware of a digital signal processor (DSP), a field-programmable gate array (FPGA), or a programmable logic array (PLA). The processor 1001 may further include a primary processor and a coprocessor. The main processor is a processor configured to process the data in an awake state, and is also referred to as a central processing unit (CPU). The coprocessor is a low-power-consumption processor configured to process the data in a standby state. In some embodiments, the processor 1001 may be integrated with a graphics processing unit (GPU), which is configured to render and draw the content that needs to be displayed by a display screen. In some embodiments, the processor 1001 may further include an Artificial Intelligence (AI) processor configured to process computational operations related to machine learning.

The memory 1002 may include one or more computer-readable storage mediums, which may be non-transitory. The memory 1002 may further include a high-speed random-access memory, and a non-volatile memory, such as one or more disk storage devices and flash storage devices. In some embodiments, a non-transitory computer-readable storage medium in the memory 1002 is configured to store at least one instruction; wherein the at least one instruction, when executed by the processor 1001, causes the process 1001 to perform the method for controlling the display apparatus according to the method embodiment of the present disclosure.

In some embodiments, the display device 1000 may further optionally include a peripheral device interface 1003 and at least one peripheral device. The processor 1001, the memory 1002, and the peripheral device interface 1003 may be connected by a bus or a signal line. Each peripheral device may be connected to the peripheral device interface 1003 by a bus, a signal line, or a circuit board. Specifically, the peripheral device includes at least one of a radio frequency circuit 1004, a display screen 1005, a camera component 1006, an audio circuit 1007, a positioning component 1008, or a power source 1009.

The peripheral device interface 1003 may be configured to connect at least one peripheral device associated with an input/output (I/O) to the processor 1001 and the memory 1002. In some embodiments, the processor 1001, the memory 1002, and the peripheral device interface 1003 are integrated on the same chip or circuit board. In some other embodiments, any one or two of the processor 1001, the memory 1002, and the peripheral device interface 1003 may be implemented on a separate chip or circuit board, which is not limited in the present embodiments.

The radio frequency circuit 1004 is configured to receive and transmit a radio frequency (RF) signal, which is also referred to as an electromagnetic signal. The radio frequency circuit 1004 communicates with a communication network and other communication devices via the electromagnetic signal. The radio frequency circuit 1004 converts an electrical signal into the electromagnetic signal to transmit, or converts the received electromagnetic signal into the electrical signal. Optionally, the RF circuit 1004 includes an antenna system, an RF transceiver, one or more amplifiers, a tuner, an oscillator, a digital signal processor, a codec chipset, a subscriber identity module card, and the like. The RF circuit 1004 may be communicated with other terminals via at least one wireless communication protocol. The wireless communication protocol includes, but is not limited to, a Web, a metropolitan area network (MAN), an intranet, various generations of mobile communication networks (2G, 3G, 4G, and 5G), a wireless local area network (LAN) and/or a wireless fidelity (Wi-Fi) network. In some embodiments, the RF circuit 1004 may further include near-field communication (NFC) related circuits, which is not limited in the present disclosure.

The display screen 1005 is configured to display a user interface (I). The UI may include graphics, text, icons, videos, and any combination thereof. When the display screen 1005 is a touch display screen, the display screen 1005 further possesses a capacity of acquiring touch signals on or over the surface of the display screen 1005. The touch signal may be input into the processor 1001 as a control signal for processing. In this case, the display screen 1005 may further be configured to provide virtual buttons and/or virtual keyboards, which are also referred to as soft buttons and/or soft keyboards. In some embodiments, one display screen 1005 may be disposed on the front panel of the display device 1000. In some other embodiments, at least two display screens 1005 may be disposed on different surfaces of the display device 1000 or in a folded design. In some other embodiments, the display screen 1005 may be a flexible display screen disposed on the curved or folded surface of the display device 1000. Even the display screen 1005 may be disposed as an irregular shape other than a rectangle. That is, the display screen 1005 may be an irregular-shaped screen. The display screen 1005 may be prepared from a material such as a liquid crystal display (LCD), an organic light-emitting diode (OLED), and the like.

The camera component 1006 is configured to capture images or videos. Optionally, the camera component 1006 includes a front camera and a rear camera. Generally, the front camera is disposed on the front panel of the terminal. In some embodiments, the camera component 1006 may further include a flashlight. The flashlight may be a monocolor temperature flashlight or a two-color temperature flashlight. The two-color temperature flash is a combination of a warm flashlight and a cold flashlight, and may be used for light compensation at different color temperatures.

The audio circuit 1007 may include a microphone and a speaker. The microphone is configured to acquire sound waves of users and environments, and convert the sound waves into electrical signals for inputting into the processor 1001 for processing, or inputting into the RF circuit 1004 for voice communication. For the purpose of stereo acquisition or noise reduction, there may be a plurality of microphones, which are disposed at different locations of the display device 1000. The microphone may further be an array microphone or an omnidirectional acquisition microphone. The speaker is configured to convert the electrical signals from the processor 1001 or the BY circuit 1004 into the sound waves. The speaker may be a conventional thin film speaker or a piezoelectric ceramic speaker. When the speaker is the piezoelectric ceramic speaker, the electrical signal can be converted into not only human-audible sound waves but also the sound waves which are inaudible to humans for ranging and the like. In some embodiments, the audio circuit 1007 may further include a headphone jack.

The positioning component 1008 is configured to position the current geographic location of the display device 1000 to implement navigation or location-based service (LBS). The positioning component 1008 may be the United States' Global Positioning System (GPS), China's BeiDou Navigation Satellite System (BDS), Russia's Global Navigation Satellite System (GLONASS), and the European Union's Galileo Satellite Navigation System (Galileo).

The power source 1009 is configured to power up various components in the display device 1000. The power source 1009 may be alternating current, direct current, a disposable battery, or a rechargeable battery. When the power source 1009 includes the rechargeable battery, the rechargeable battery may support wired charging or wireless charging. The wired rechargeable battery may be a battery charged by a wired line, and the wireless rechargeable battery may be a battery charged by a wireless coil. The rechargeable battery may further support the fast charging technology.

In some embodiments, the display device 1000 further includes one or more sensors 1010. The one or more sensors 1010 include, but are not limited to, an acceleration sensor 1011, a gyro sensor 1012, a force sensor 1013, a fingerprint sensor 1014, an optical sensor 1015, and a proximity sensor 1016.

The acceleration sensor 1011 may detect magnitudes of accelerations on three coordinate axes of a coordinate system established by the display device 1000. For example, the acceleration sensor 1011 may be configured to detect components of a gravitational acceleration on the three coordinate axes. The processor 1001 may control the display screen 1005 to display a user interface in a landscape view or a portrait view based on a gravity acceleration signal acquired by the acceleration sensor 1011. The acceleration sensor 1011 may further be configured to acquire motion data of a game or a user.

The gyro sensor 1012 may detect a body direction and a rotation angle of the display device 1000, and may cooperate with the acceleration sensor 1011 to capture a 3D motion of the user on the display device 1000. Based on the data captured by the gyro sensor 1012, the processor 1001 may implement the following functions: motion sensing (such as changing the UI according to a tilt operation of the user), image stability in shooting, game control and inertial navigation.

The force sensor 1013 may be disposed on a side frame of the display device 1000 and/or a substratum of the display screen 1005. When the force sensor 1013 is disposed on the side frame of the display device 1000, a holding signal of the user on the display device 1000 may be detected. The processor 1001 may perform a left-right hand recognition or a quick operation based on the holding signal acquired by the force sensor 1013. When the force sensor 1013 is disposed on the substratum of the display screen 1005, the processor 1001 controls an operable control on the UI based on a press operation of the user on the display screen 1005.

The operable control includes at least one of a button control, a scroll bar control, an icon control, and a menu control.

The fingerprint sensor 1014 is configured to acquire a fingerprint of the user. The processor 1001 identifies the identity of the user based on the fingerprint acquired by the fingerprint sensor 1014, or the fingerprint sensor 1014 identifies the identity of the user based on the acquired fingerprint. When the identity of the user is identified as a trusted identify, the processor 1001 authorizes the user to perform related sensitive operations, such as unlocking the screen, viewing encrypted information, downloading software, paying, and changing settings. The fingerprint sensor 1014 may be provided on the front, back, or side of the display device 1000. When the display device 1000 is provided with a physical button or a Logo of a manufacturer, the fingerprint sensor 1014 may be integrated with the physical button or the Logo of the manufacturer.

The optical sensor 1015 is configured to acquire ambient light intensity. In one embodiment, the processor 1001 may control the display luminance of the display screen 1005 based on the intensity of the ambient light acquired by the optical sensor 1015. Specifically, when the intensity of the ambient light is high, the display luminance of the display screen 1005 is increased; and when the intensity of the ambient light is low, the display luminance of the display screen 1005 is decreased. In another embodiment, the processor 1001 may further dynamically adjust shooting parameters of the camera component 1006 based on the intensity of the ambient light acquired by the optical sensor 1015.

The proximity sensor 1016, also referred to as a distance sensor, is generally disposed on the front panel of the display device 1000. The proximity sensor 1016 is configured to capture a distance between the user and a front surface of the display device 1000. In one embodiment, when the proximity sensor 1016 detects that the distance between the user and the front surface of the display device 1000 gradually decreases, the processor 1001 controls the display screen 1005 to switch from a screen-on state to a screen-off state. When the proximity sensor 1016 detects that the distance between the user and the front surface of the display device 1000 gradually increases, the processor 1001 controls the display screen 1005 to switch from the screen-off state to the screen-on state.

It is understood by those skilled in the art that the structure shown in FIG. 12 does not constitute a limitation to the display device 1000, and may include more or less components than those illustrated, or may combine some components or adopt different component arrangements.

In the present disclosure, the terms "first," "second," and "third" are used to descriptive purposes, and are not construed to indicate or imply relative importance. Unless expressly limited otherwise, the term "a plurality of" refers to two or more.

In the embodiments of the present disclosure, it should be noted that the described apparatus and method may be implemented in other fashions. For example, the above embodiments of the apparatus are merely illustrative. For example, the division of the units are merely a division based on logic functions, and other divisions may exist in actual implementations. For example, a plurality of units and assemblies may be combined or integrated on another system, or some features may be omitted or not performed. In addition, the shown or discussed mutual coupling, direct coupling, or communication connection may be through some interfaces, and indirect coupling or communication connection of devices or units may be in electrical, mechanical or other forms.

The units described as separate components may or may not be physically separated. Components displayed as units may or may not be physical units, that is, may be in one place, or may be distributed to a plurality of network units. Some or all of the units may be selected according to actual needs to achieve the purpose of the solutions in the embodiments.

It should be understood by those of ordinary skill in the art that all or part of the steps for performing the above embodiments can be performed by hardware, and can be performed by instructing relevant hardware by a program, and the program may be stored in a computer-readable storage medium. The above storage medium may be a read-only memory, a magnetic disk, an optical disk, or the like.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A method for controlling a display apparatus, the method comprising:
receiving at least two pieces of data to be displayed from at least two terminals respectively, wherein the at least two pieces of data to be displayed comprise screen projection data and status parameters of the at least two terminals; and
displaying the status parameters, and performing a screen projection based on the screen projection data,
wherein displaying the status parameters, and performing the screen projection based on the screen projection data comprise:
performing the screen projection and displaying the status parameters on at least two display regions of a display face of the display apparatus respectively,
wherein the method further comprises:
acquiring display region adjustment information; and
adjusting the at least two display regions based on the display region adjustment information,
wherein the display apparatus comprises a human eye detection assembly; and acquiring the display region adjustment information comprises:
acquiring a distance between human eyes viewing the display apparatus and the display face of the display apparatus by the human eye detection assembly;
determining a size of a daze region of the human eyes based on the distance and a predetermined vision field of the human eyes; and
generating the display region adjustment information based on the size of the gaze region of the human eyes, wherein the display region adjustment information is indicative of setting sizes of the at least two display regions to be less than or equal to the size of the gaze region of the human eyes,
wherein the distance between human eyes viewing the display apparatus and the display face is a mean value of two distances between two eyes and the display face respectively,
wherein the method further comprises:
displaying power of a second terminal.

2. The method according to claim 1, wherein receiving the at least two pieces of data to be displayed from the at least two terminals respectively comprises:
   receiving the screen projection data from a first terminal; and
   receiving the status parameter of the second terminal from the second terminal.

3. The method according to claim 2, further comprising:
   acquiring a control signal, wherein the control signal is configured to adjust the status parameter of the second terminal; and
   sending the control signal to the second terminal.

4. The method according to claim 1, wherein the display apparatus comprises a human eye detection assembly; and acquiring the display region adjustment information comprises:
   acquiring a distance between human eyes viewing the display apparatus and the display face of the display apparatus and a gaze position of the human eyes by the human eye detection assembly;
   determining a size of a gaze region of the human eyes based on the distance and a predetermined vision field of the human eyes; and
   generating the display region adjustment information based on the size of the gaze region of the human eyes and the gaze position of the human eyes, wherein the display region adjustment information is indicative of setting sizes of target display regions in the at least two display regions to be less than or equal to the size of the gaze region of the human eyes, the target display regions being display regions comprising the gaze position.

5. The method according to claim 1, further comprising:
   acquiring information of human eyes of multiple users by the human eye detection assembly in the case that the multiple users view the display apparatus, and determining one of the information of the human eyes of the multiple users as default information of the human eyes; and
   acquiring the display region adjustment information based on the default information of the human eyes.

6. The method according to claim 5, wherein acquiring the information of the human eyes of the multiple users by the human eye detection assembly, and determining one of the information of the human eyes of the multiple users as the default information of the human eyes comprise:
   acquiring an image by the human eye detection assembly;
   acquiring the information of the human eyes of the multiple users based on the image; and
   determining information of the human eyes closest to a center of the image as the default information of the human eyes.

7. The method according to claim 1, further comprising:
   adjusting backlight of the display apparatus by local dimming, such that luminance of the at least two display regions is smoothly transitioned.

8. The method according to claim 7, wherein the display face of the display apparatus comprises a plurality of backlight zones; and adjusting the backlight of the display apparatus by local dimming comprises:
   acquiring a mean value of pixel values in each of the plurality of backlight zones in the display face of the display apparatus;
   acquiring a backlight luminance value corresponding to each of the plurality of backlight zones based on the mean value of the pixel values in each of the plurality of backlight zones; and
   acquiring a target luminance value of each of the plurality of backlight zones by smoothing the backlight luminance value corresponding to each of the plurality of backlight zones by a cubic B-spline curve.

9. The method according to claim 2, wherein the second terminal comprises a smart home device, and the status parameter comprises at least one of temperature, humidity, power, battery charge level, and wind, monitor parameter, and smart latch status.

10. The method according to claim 1, wherein the at least two pieces of data to be displayed further comprise video monitor data; and the method further comprises:
    displaying the video monitor data.

11. A display device, comprising: a processor and a memory storing at least one instruction, at least one program, a code set, or an instruction set, wherein the processor, when loading and executing the at least one instruction, the at least one program, the code set, or the instruction set, is caused to perform:
    receiving, by a display apparatus, at least two pieces of data to be displayed from at least two terminals respectively, wherein the at least two pieces of data to be displayed comprise screen projection data and status parameters of the at least two terminals; and
    displaying, by the display apparatus, the status parameters, and performing a screen projection based on the screen projection data,
    wherein the processor, when loading and executing the at least one instruction, the at, least one program, the code set, or the instruction set, is caused to perform;
    performing the screen projection and displaying the status parameters on at least two display regions of a display face of the display apparatus respectively,
    wherein the processor, when loading and executing the at least one instruction, the at least one program, the code set, or the instruction set, is caused to further perform;
    acquiring display region adjustment information; and
    adjusting the at least two display regions based on the display region adjustment information,
    wherein the display apparatus comprises a human eye detection assembly; and the processor, when loading and executing the at least one instruction, the at least one program, the code set, or the instruction set, is caused to perform;
    acquiring a distance between human eyes viewing the display apparatus and the display face of the display apparatus by the human eye detection assembly;
    determining a size of a gaze region of the human eyes based on the distance and a predetermined vision field of the human eyes; and
    generating the display region adjustment information based on the size of the gaze region of the human eyes, wherein the display region adjustment information is indicative of setting sizes of the at least two display regions to be less than or equal to the size of the gaze region of the human eyes,
    wherein the distance between human eyes viewing the display apparatus and the display face is a mean value of two distances between two eyes and the display face respectively,
    wherein the processor, when loading and executing the at least one instruction the at, least one program, the code set, or the instruction set, is caused to further perform;
    displaying power of a second terminal.

12. The display device according to claim 11, wherein the processor, when loading and executing the at least one instruction, the at least one program, the code set, or the instruction set, is caused to perform:
receiving the screen projection data from a first terminal; and
receiving the status parameter of a second terminal from the second terminal.

13. The display device according to claim 12, wherein the processor, when loading and executing the at least one instruction, the at least one program, the code set, or the instruction set, is caused to further perform:
acquiring a control signal, wherein the control signal is configured to adjust the status parameter of the second terminal; and
sending the control signal to the second terminal.

14. A non-transitory computer storage medium, storing at least one instruction, at least one program, a code set, or an instruction set, wherein the at least one instruction, the at least one program, the code set, or the instruction set, when loaded and executed by a processor, causes the processor to perform:
receiving, by a display apparatus, at least two pieces of data to be displayed from at least two terminals respectively, wherein the at least two pieces of data to be displayed comprise screen projection data and status parameters of the at least two terminals; and
displaying, by the display apparatus, the status parameters, and performing a screen projection based on the screen projection data,
wherein displaying the status parameters, and performing the screen projection based on the screen projection data comprise:
performing the screen projection and displaying the status parameters on at least two display regions of a display face of the display apparatus respectively,
wherein the at least one instruction, the at least one program, the code set, or the instruction set, when loaded and executed by a processor, causes the processor to further perform;
acquiring display region adjustment information; and
adjusting the at least two display regions based on the display region adjustment information,
wherein the display apparatus comprises a human eye detection assembly and acquiring the display region adjustment information comprises;
acquiring a distance between human eyes viewing the display apparatus and the display face of the display apparatus by the human eye detection assembly;
determining a size of a gaze region of the human eyes based on the distance and a predetermined vision field of the human eyes; and
generating the display region adjustment information based on the size of the gaze region of the human eyes, wherein the display region adjustment information is indicative of setting sizes of the at least two display regions to be less than or equal to the size of the gaze region of the human eyes,
wherein the distance between human eyes viewing the display apparatus and the display face is a mean value of two distances between two eyes and the display face respectively,
wherein the at least one instruction, the at least one program, the code set, or the instruction set, when loaded and executed by a processor, causes the processor to further perform;
displaying power of a second terminal.

* * * * *